United States Patent
Kritayakirana et al.

(10) Patent No.: US 7,167,476 B1
(45) Date of Patent: Jan. 23, 2007

(54) SYSTEMS AND METHODS FOR ROUTING DATA IN A NETWORK DEVICE

(75) Inventors: Kong Kritayakirana, San Francisco, CA (US); Brian Gaudet, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 1033 days.

(21) Appl. No.: 10/120,443

(22) Filed: Apr. 12, 2002

(51) Int. Cl.
    *H04L 12/28* (2006.01)
    *H04L 12/56* (2006.01)

(52) U.S. Cl. .................................... 370/394; 714/746

(58) Field of Classification Search ................ 370/392, 370/394, 229–236, 389, 442, 472, 473, 474, 370/475; 375/359; 714/746–750, 447, 751, 714/752
See application file for complete search history.

(56) References Cited

U.S. PATENT DOCUMENTS

| | | | |
|---|---|---|---|
| 5,446,765 A | 8/1995 | Leger | 375/359 |
| 5,878,061 A | 3/1999 | Hauck et al. | 714/800 |
| 6,233,294 B1 | 5/2001 | Bowers et al. | 375/356 |
| 6,323,793 B1 | 11/2001 | Howald et al. | 341/137 |
| 6,463,074 B1* | 10/2002 | Johnson et al. | 370/442 |
| 6,493,359 B1 | 12/2002 | Sorgi et al. | 370/506 |
| 6,549,595 B1 | 4/2003 | Den Besten et al. | 375/360 |
| 6,618,395 B1 | 9/2003 | Kimmitt | 370/473 |
| 6,667,993 B1 | 12/2003 | Lippett et al. | 370/509 |
| 6,667,994 B1 | 12/2003 | Farhan | 370/535 |
| 6,680,970 B1 | 1/2004 | Mejia | 375/225 |
| 6,738,392 B1 | 5/2004 | Thurston | 370/503 |
| 6,754,235 B1 | 6/2004 | Van Der Putten et al. | 370/503 |
| 6,845,104 B1* | 1/2005 | Johnson et al. | 370/442 |
| 2005/0105547 A1* | 5/2005 | Johnson et al. | 370/458 |

OTHER PUBLICATIONS

Co-pending U.S. Appl. No. 09/879,176 filed Jun. 13, 2001; 23 pg. specification and Figs. 1-5.

* cited by examiner

*Primary Examiner*—Ajit Patel
(74) *Attorney, Agent, or Firm*—Harrity Snyder, L.L.P.

(57) ABSTRACT

A system detects an error in a network device that receives data via a group of data streams. The system receives a data unit, where the data unit is associated with at least one of the streams and a sequence number for each of the associated streams. The system determines whether each sequence number associated with the data unit is a next sequence number for the corresponding stream, and detects an error for a particular stream when the sequence number for that stream is not a next sequence number.

26 Claims, 4 Drawing Sheets

SYSTEMS AND METHODS FOR ROUTING DATA IN A NETWORK DEVICE

RELATED APPLICATION

The present application relates to U.S. patent application Ser. No. 09/879,176, entitled, "SOURCE SYNCHRONOUS LINK WITH CLOCK RECOVERY AND BIT SKEW ALIGNMENT," filed Jun. 13, 2001, now U.S. Pat. No. 7,061,939, which is expressly incorporated by reference herein.

BACKGROUND OF THE INVENTION

1. Field of the Invention

The present invention relates generally to data transfer, and more particularly, to systems and methods for routing data in a network device.

2. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was turned on.

To meet the new demands, purpose-built routers were designed with components optimized for routing. They not only handle higher line rates and higher network traffic volume, they also add functionality without compromising line rate performance.

A purpose-built router may include a number of input and output ports from which the router transmits and receives information packets via multiple individual data streams. A packet received at one port is directed to its appropriate output port based on an examination and processing of the packet's header information, which includes an indication of the packet's destination. In some instances, the links within the router that transport the packet from one port to another may be unreliable, thereby causing packet errors. Conventional error detection and handling routines do not distinguish between the data streams associated with packets having errors. Accordingly, an error affecting one stream affects the transmission of data via the other streams.

Accordingly, it is desirable to improve error detection and handling in a network device.

SUMMARY OF THE INVENTION

Systems and methods consistent with the principles of the invention address this and other needs by providing the ability to detect and mark errors on a per stream basis.

One aspect consistent with principles of the invention is directed to a method that detects an error in a network device that receives data via a group of streams. The method includes receiving a data unit, where the data unit is associated with at least one stream and includes a sequence number for each associated stream. The method further includes determining, for each stream with which the data unit is associated, whether the sequence number is a next sequence number and detecting, for each stream with which the data unit is associated, an error when the sequence number is not a next sequence number.

A second aspect consistent with principles of the invention is directed to a network device that receives data via a group of streams and includes a transmitter and a receiver. The transmitter transmits a data unit including at least one stream identifier that identifies one of the streams and a sequence number corresponding to each stream identifier. The receiver receives the data unit, determines whether each sequence number associated with the data unit is a next sequence number for the corresponding stream, and detects an error when one of the sequence numbers is not a next sequence number.

A third aspect consistent with principles of the invention is directed to a network device that includes an interface transmitter, a group of high speed transmitters, a group of high speed receivers, a tandem aligner, and an interface receiver. The interface transmitter receives a data unit that includes packet data and control information and transmits the data unit. Each of the high speed transmitters receives a portion of the data unit and transmits the portion of the data unit in synchronism with the other of the high speed transmitters via a high speed link. Each of the high speed receivers corresponds to one of the high speed transmitters. Each high speed receiver receives the portion of the data unit from the corresponding high speed transmitter and forwards the portion of the data unit. The tandem aligner receives the portions of the data unit from the high speed receivers, corrects an imbalance or delay between the portions of the data units caused by the high speed links, and forwards the corrected portions of the data unit. The interface receiver receives the corrected portions of the data unit and reconstruct the packet data and control information from the corrected portions.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a system detects and marks errors on a per stream basis. In one implementation consistent with the principles of the invention, per-stream flow control information is transmitted along with packet data.

System Configuration

Figure 1:
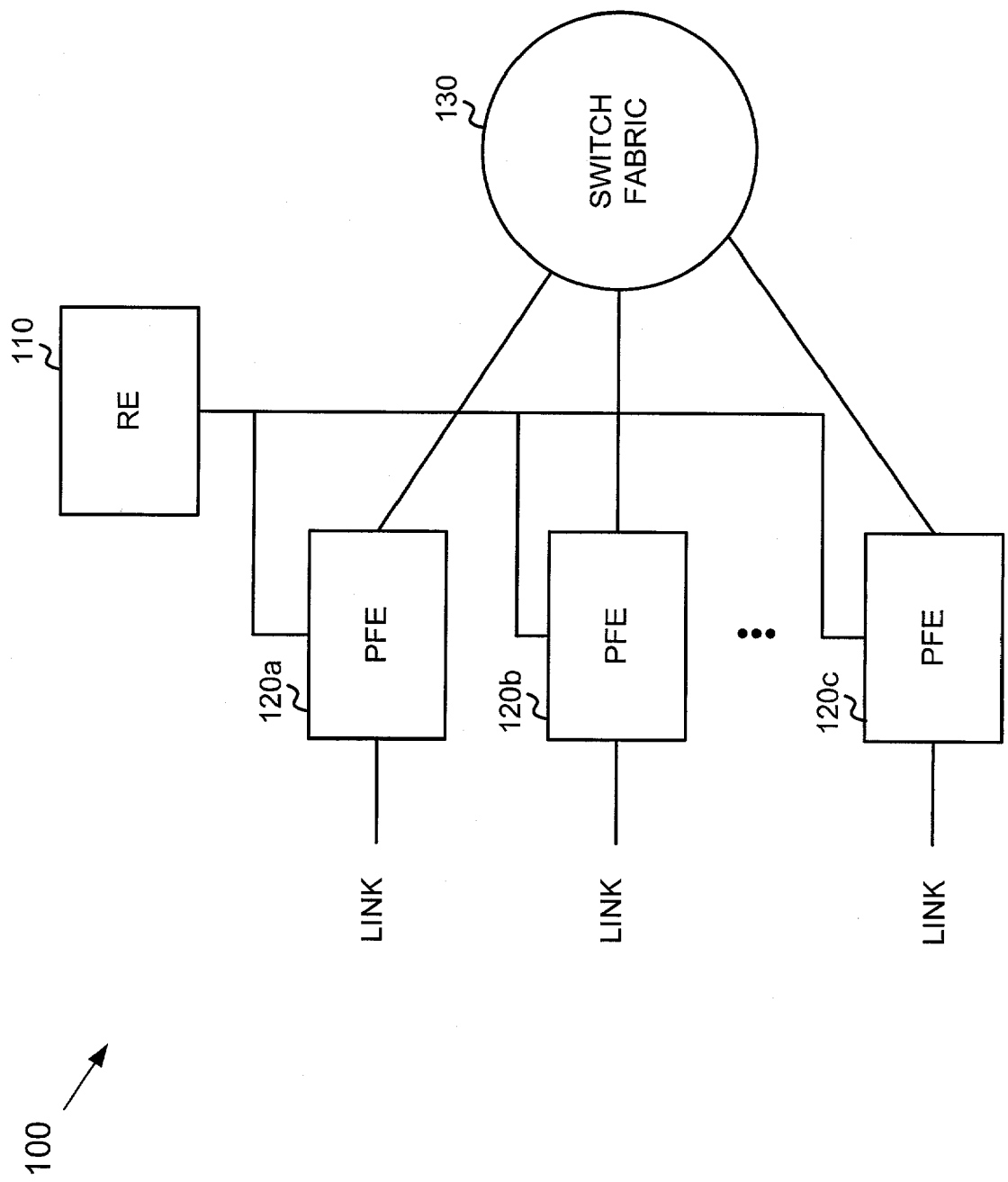
FIG. 1 is a block diagram illustrating an exemplary routing system in which systems and methods consistent with the principles of the invention may be implemented.

FIG. 1 is a block diagram illustrating an exemplary routing system 100 in which systems and methods consistent with the principles of the invention may be implemented. System 100 receives data streams from physical links, processes the data streams to determine destination information, and transmits the data streams out on a link in accordance with the destination information. System 100 may include a routing engine (RE) 110, packet forwarding engines (PFEs) 120a, 120b, . . . 120x (collectively, "120"), and a switch fabric 130.

RE 110 performs high level management functions for system 100. For example, RE 110 communicates with other networks and systems connected to system 1100 to exchange information regarding network topology. RE 110 creates routing tables based on network topology information, creates forwarding tables based on the routing tables, and forwards the forwarding tables to PFEs 120. PFEs 120 use the forwarding tables to perform route lookups for incoming packets. RE 110 also performs other general control and monitoring functions for system 100.

PFEs 120 are each connected to RE 110 and switch fabric 130. PFEs 120 receive data on physical links connected, for example, to a network, such as a wide area network (WAN) or local area network (LAN), or a device. Each physical link could be one of many types of transport media, such as optical fiber or Ethernet cable. The data on the physical link is formatted according to one of several protocols, such as the synchronous optical network (SONET) standard or Ethernet.

Each of PFEs 120 processes incoming data by stripping off the data link layer. For example, in one embodiment, the data remaining after the data link layer is stripped off is packet data. Each of PFEs 120 may store control information regarding the packet and the packet data in a series of cells. In one embodiment, the control information is stored in the first two cells of the series of cells.

Each of PFEs 120 performs a route lookup using the control information and the forwarding table from RE 110 to determine destination information. Each of PFEs 120 may also further process the control information to perform protocol-specific functions, policing, and accounting, and might even modify the control information to form a new control information.

For example, if PFE 120a is processing a packet, and the destination information in the packet indicates that the packet should be sent out on a physical link connected to PFE 120a, then PFE 120a retrieves the cells for the packet, converts the control information or new control information into header information, forms a packet using the packet data from the cells and the header information, and transmits the packet from the port associated with the physical link.

If the destination indicates that the packet should be sent to another PFE via switch fabric 130, such as PFE 120x, then PFE 120a retrieves the cells for the packet, may modify the first two cells with the new control information, if necessary, and sends the cells to PFE 120x via switch fabric 130. Before transmitting the cells over switch fabric 130, PFE 120a may append a sequence number to each cell, which allows PFE 120x to reconstruct the order of the transmitted cells. Additionally, PFE 120x may use the control information to form a packet using the packet data from the cells, and sends the packet out on the port associated with the appropriate physical link of PFE 120x.

In summary, RE 110, PFEs 120, and switch fabric 130 perform routing based on packet-level processing. PFEs 120 store each packet in the form of cells while performing a route lookup using control information, which is based on packet header information. A packet might be received on one of PFEs 120 and go back out to the network (or device) on the same one of PFEs 120, or be sent through switch fabric 130 to be sent out to the network (or device) on a different one of PFEs 120.

Figure 2:
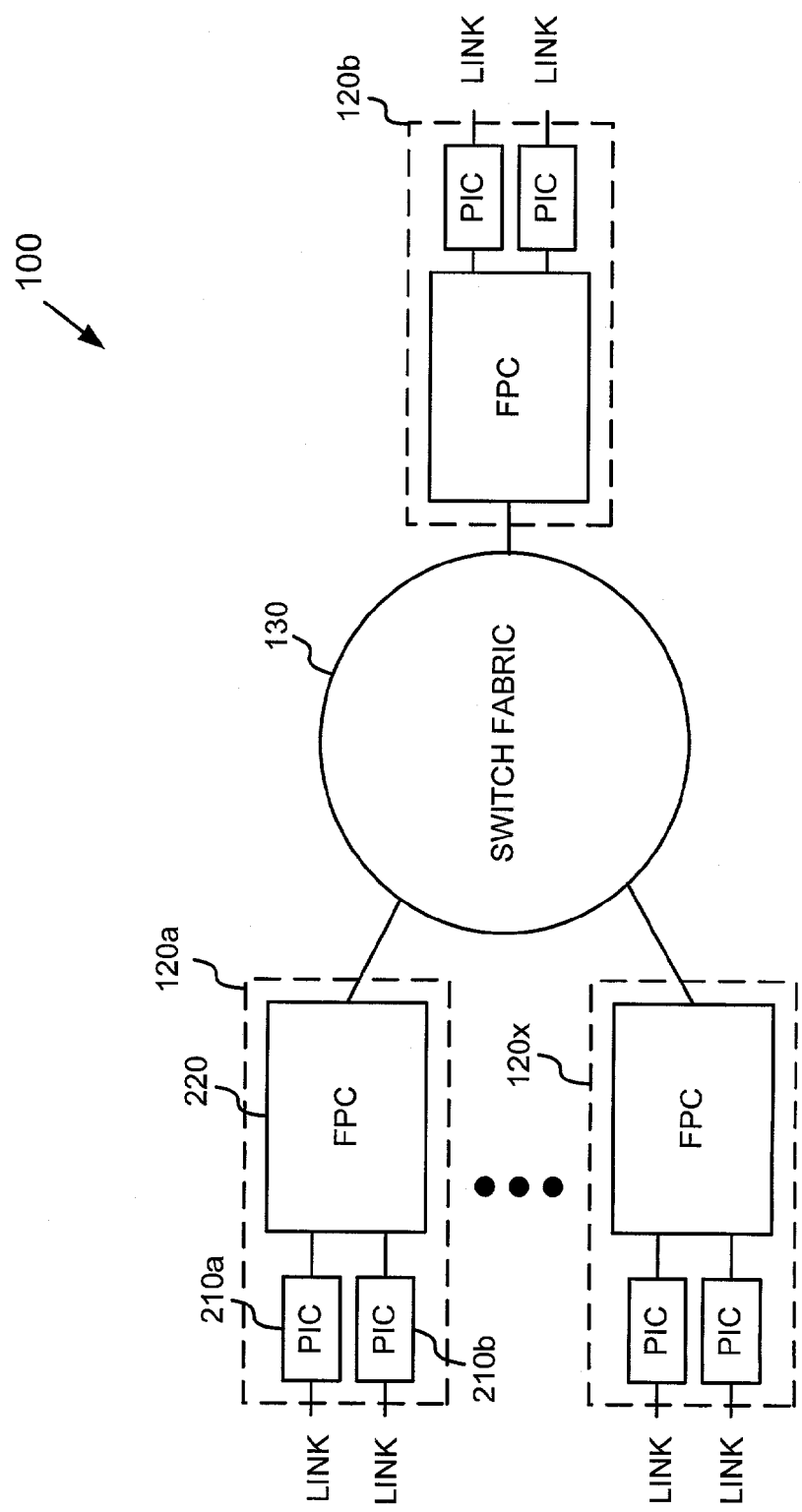
FIG. 2 is an exemplary detailed block diagram illustrating portions of the routing system of FIG. 1.

FIG. 2 is an exemplary detailed block diagram illustrating portions of routing system 100. PFEs 120 connect to one another through switch fabric 130. Each of PFEs 120 may include one or more physical interface cards (PICs) 210a, 210b (collectively, "210") and a flexible port concentrator (FPC) 220. Although FIG. 2 illustrates one FPC 220 per PFE 120, embodiments consistent with the principles of the invention may include multiple FPCs 220 per PFE 120.

Each of PICs 210 transmits data between a physical link and an FPC 220. Different PICs 210 are designed to handle different types of physical links. For example, one of PICs 210 may be an interface for an optical link while the other PIC may be an interface for an Ethernet link.

For incoming data, in one embodiment, PICs 210 may strip off the layer 1 (L1) protocol information and forward the remaining data, such as raw packets, in the form of cells to FPCs 220. For outgoing data, PICs 210 may receive packets from FPCs 220, encapsulate the packets in L1 protocol information, and transmit the data on the physical link.

FPCs 220 perform routing functions and handle packet transfers to and from PICs 210 and switch fabric 130. For each packet it handles, FPC 220 performs the previously-described route lookup function. Although FIG. 2 shows two PICs 210 connected to each of FPCs 220 and three FPCs 220 connected to switch fabric 130, in other embodiments consistent with the principles of the invention, there can be more or fewer PICs 210 and FPCs 220.

FPC 220 may connect to PICs 210 via one or more high speed links. In one embodiment, FPC 220 connects to each PIC 210 via two high speed links. The two high speed links may allow, for example, 16 bytes of information to be transmitted at 155 MHz, along with a start of cell pulse or cyclic redundancy check (CRC) error pulse every 9 clock cycles. Of the 16 bytes, 12 bytes may carry data and 4 bytes may carry control information, such as error information, sequence numbers, and stream identifiers. The start pulse indicates that the following or accompanying information contains valid data. The CRC error pulse indicates that the cell contains an error and should be discarded. In an implementation consistent with the principles of the invention, the PIC/FPC interface supports up to 64 streams of traffic, with arbitrary stream sizing.

As will be described in additional detail below, each stream writes an incrementing sequence to the sequence number field of the control information. This sequence number is checked on a per stream basis upon receipt. If a missing number exists, the associated packet is marked as containing an error. Moreover, if a cell transmitted over the high speed links has a CRC error, the cell is discarded. The resulting gap in the sequence number for a stream facilitates error detection on a per stream basis.

Figure 3:
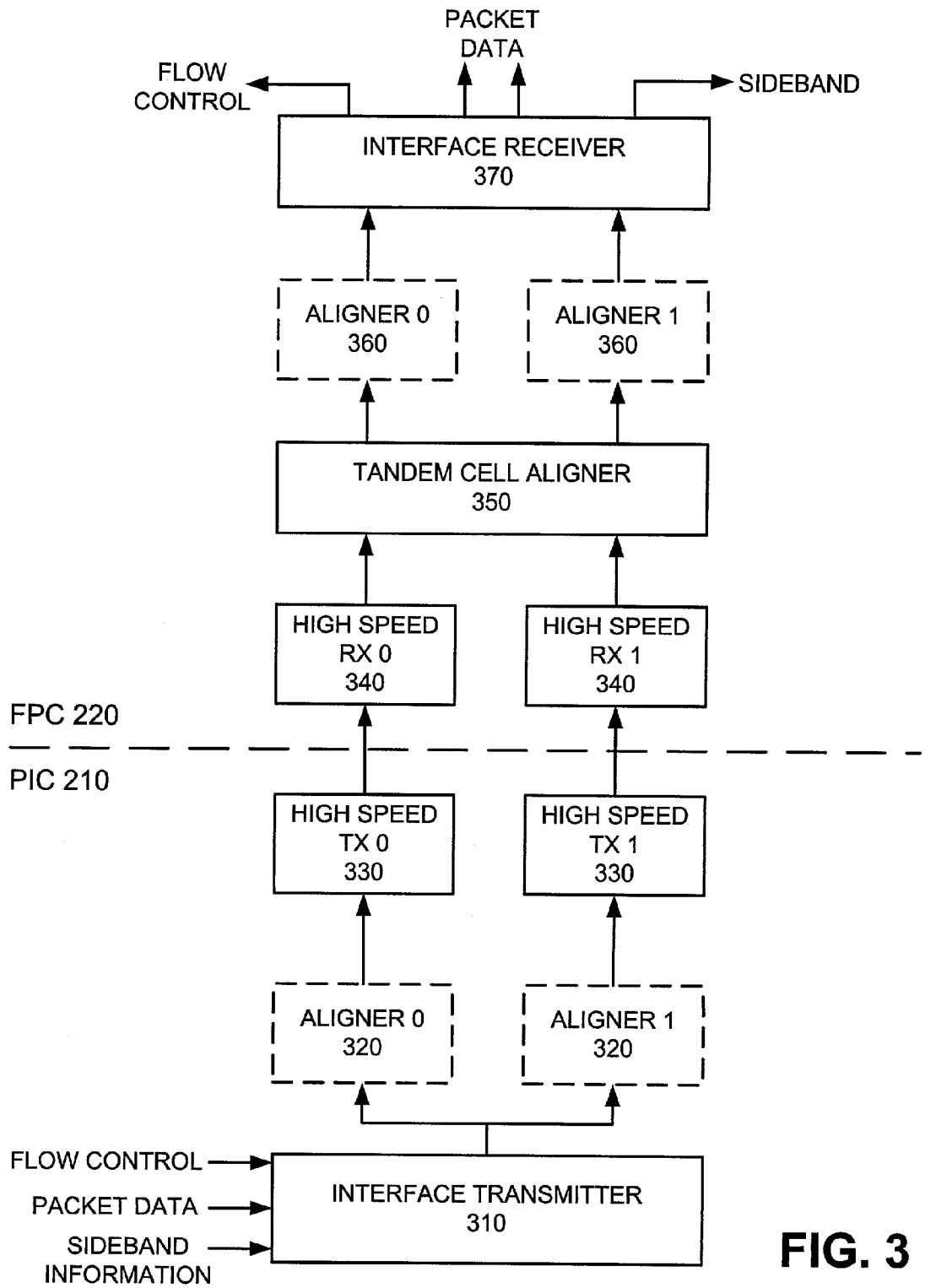
FIG. 3 is an exemplary illustration of the interface between the flexible port concentrator (FPC) and the physical interface card (PIC) according to an implementation consistent with the principles of the invention.

FIG. 3 is an exemplary illustration of the interface between one of FPCs 220 and one of PICs 210 according to an implementation consistent with the principles of the invention. While the following description focuses on transmitting traffic from one of PICs 210 to one of FPCs 220, it will be appreciated that the techniques described herein may also be applied to traffic transmitted from one of FPCs 220 to one of PICs 210. The interface may be used with a high speed bus implementation, such as that described in U.S. patent application Ser. No. 09/879,176.

As illustrated, PIC 210 includes an interface transmitter 310, an optional pair of aligners 320, and a pair of high speed transmitters (TXs) 330. FPC 220 includes a pair of high speed receivers (RXs) 340, a tandem cell aligner 350, an optional pair of aligners 360, and an interface receiver 370. It will be appreciated that PIC 210 and FPC 220 may include additional devices (not shown) that aid in receiving, processing, or transmitting data. Moreover, the number of components illustrated in FIG. 3 is exemplary.

PIC 210 receives packets from the network and processes the packets via one or more processing modules. The resulting information may include packet data and control information, such as a start of packet (SOP) flag, an end of packet (EOP) flag, error data, a pointer that indicates the number of bytes in the packet that are valid, and a stream identifier. In an implementation consistent with the principles of the invention, the packet data is 12 bytes (or 96 bits), while the control information consists of 4 bytes (or 32 bits).

Exemplary control information may include a stream validity field, a flow control block field, a flow control field, a pointer field, an error field, a sequence number field, a sop field, an eop field, and a stream identifier field. The stream validity field indicates whether the 12 bytes of data includes valid data. The flow control block field identifies the block of streams (e.g., streams 7–0, 15–8, . . . , 63–56) for which flow control is being sent. The flow control field stores a string of bits that indicates which streams in a block of streams request transmission of flow control. For example, assume that the string of bits is "00001111." When the flow control block is 0, this may mean that streams 0–3 request transmission of flow control. When the flow control block is 1, this may mean that streams 8–11 request transmission of flow control.

The pointer field stores a pointer that points to the end of packet, if it exists. The error field stores a bit that indicates whether the end of packet is for a packet containing an error. This bit may only be set if the eop bit is set. The sequence number field is used for error detection and recovery. The sequence number may be associated with bus transactions and allow the system to determine which stream was affected by a CRC error.

The sop field stores a bit that indicates that a start of packet is on byte 11. The eop field stores a bit that indicates that an end of packet falls within the 12 bytes of data. The stream identifier field stores a group of bits that identifies the stream number associated with the 12 bytes of data and 4 bytes of control information during a particular clock cycle.

Interface transmitter 310 receives the packet data and control information from the processing modules of PIC 210. Interface transmitter 310 may include one or more buffers that temporarily store the packet data and control information to be transmitted to FPC 220. Interface transmitter 310 transmits the 128 bits of information (e.g., the 96 bits of packet data and the 32 bits of control information) in the form of cells to aligners 320 every clock cycle, with each aligner 320 receiving 64 bits of information. It will be appreciated that a cell may carry traffic for multiple bus transactions, each from a different stream. In one embodiment, interface transmitter 310 may transmit 64 bits of packet data to aligner 0 and 32 bits of packet data, along with 32 bits of control information, to aligner 1.

In some instances, aligners 320 may be necessary to align the data from interface transmitter 310 to a different data width. For example, if high speed transmitters 330 operate on 66 bits of data, aligners 320 may be necessary to align the 64 bits of information from interface transmitter 310 to 66 bits using conventional techniques. When high speed transmitters 330 do not have such a requirement, this alignment operation may be avoided. In such a situation, interface transmitter 310 may transmit 64 bits of information directly to each of high speed transmitters 330.

High speed transmitters 330 transmit information from PIC 210 to FPC 220 at very high speeds. In one implementation consistent with the principles of the invention, high speed transmitters 330 operate in synchronism. This ensures that high speed transmitters 330 transmit information over the high speed links connecting PIC 210 and FPC 220 at the same time.

FPC's high speed receivers 340 receive the information from high speed transmitters 330, recover the information back into 66-bit data blocks, and transmit the 66 bits of information to tandem cell aligner 350. Tandem cell aligner 350 compensates and corrects skews that can happen as a result of an imbalance or delay between the links connecting PIC 210 and FPC 220.

If it was necessary to adjust the alignment of the information from interface transmitter 310, aligners 360 place the information from tandem cell aligner 350 back to its original width. For example, if aligners 320 aligned 64 bits of information to a 66-bit width, aligners 360 align the 66 bits of information received from tandem cell aligner 350 back into its original 64-bit width.

Interface receiver 370 receives the 64 bits of information from aligners 360 and retrieves the original data from the information. That is, interface receiver 370 retrieves the packet data and control information that was received by interface transmitter 310. Interface receiver 370 may also, as will be described below, perform error detection and handling based on the received information.

Exemplary Processing

Figure 4:
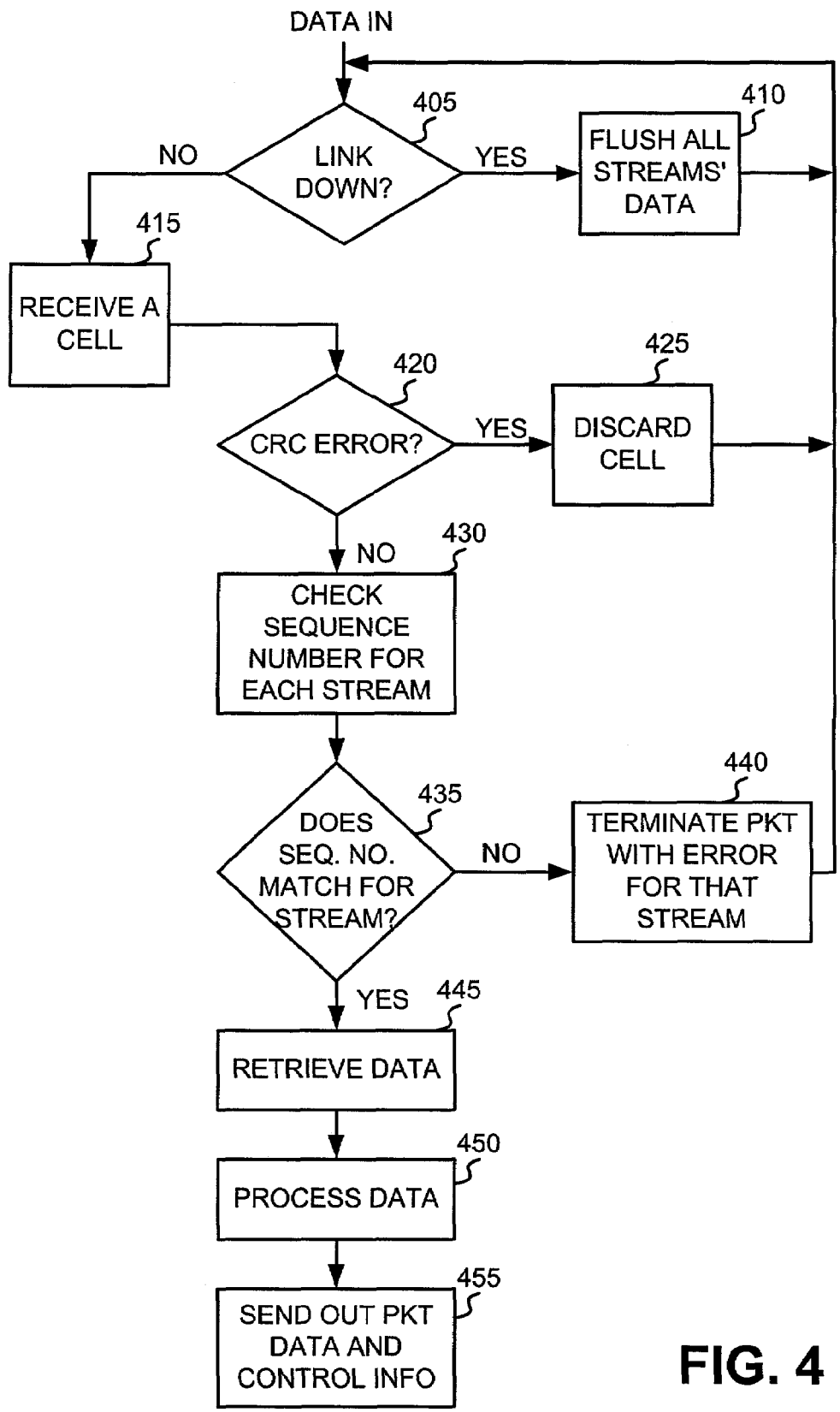
FIG. 4 is a flowchart of an exemplary process for transmitting traffic between the PIC and FPC in an implementation consistent with the principles of the invention.

FIG. 4 is a flowchart of an exemplary process for transmitting traffic between a PIC 210 and FPC 220 in an implementation consistent with the principles of the invention. In one embodiment, the processing described herein is performed by interface receiver 370 (FIG. 3). Interface receiver 370 may perform acts 405 through 425 on a per cell basis, while performing acts 430 through 455 on a per clock cycle basis.

Processing may begin with interface receiver 370 determining whether the high speed link between PIC 210 and FPC 220 is down [act 405]. Interface receiver 370 may make this determination by monitoring received information, such as a start pulse or CRC pulse. Interface transmitter 310 may transmit a start pulse or a CRC error pulse at predetermined time intervals. If the predetermined time interval passes without interface receiver 370 receiving either a start pulse or a CRC error pulse, then interface receiver 370 determines that the link is down. In response, interface receiver 370 flushes the data from all streams [act 410]. Interface receiver 370 may flush data from the streams by marking packets in the streams with an end of packet error (EOPE). Processing may then return to act 405.

When the link is up, interface receiver 370 may receive a cell [act 415]. Interface receiver 370 may then determine whether a start pulse or CRC error pulse was received with the cell [act 420]. In the event that a CRC error pulse was received with the cell, interface receiver 370 discards the cell [act 425]. Processing may then return to act 405.

If a start pulse was received with the cell, interface receiver 370 checks the sequence number for each stream associated with the cell [act 430]. As noted above, a cell may carry traffic for multiple bus transactions, each from a different stream. If the sequence number does not match for a stream (i.e., the sequence number is not a next sequence number for that particular stream) [act 435], interface receiver 370 may terminate the packet with an error for that stream [act 440]. As described above, when terminating a packet, interface receiver 370 may mark the packet with an EOPE. Processing may then return to act 405.

If the sequence number for the stream matches [act 435], interface receiver 370 retrieves the data from the cell [act 445], processes the data as necessary [act 450], and transfers the data and control information for further processing by FPC 220. When operating normally (i.e., without error), the above processing would be equivalent to transmitting data over a wire having a delay through it.

The above interface supports a very high bandwidth (e.g., up to OC-192). Moreover, the interface supports dynamic stream sizing. For example, in one embodiment, the interface can support up to 64 streams that can be increased or decreased in OC-3 granularity. The interface allows for detection and recovery from errors for each stream individually based on the sequence numbers. This limits the impact of an error cell to the affected streams, allowing other streams to flow uninterrupted. It also allows for quick identification and recovery from errors.

The interface processing provides the ability to embed flow control along with data on a per-stream basis. The interface processing also provides the ability to tag individual packets with an end of packet error (i.e., mark the packet as "good" or "bad"), thereby improving error handling.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described in FIG. 4, the order of the acts may vary in other implementations consistent with the principles of the invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for detecting an error in a network device that receives data via a plurality of streams, comprising:
   receiving a data unit, the data unit being associated with at least two streams in the plurality of streams and including a sequence number and a stream identifier for each stream with which the data unit is associated;
   determining, for each stream with which the data unit is associated, whether the sequence number is a next sequence number; and
   detecting, for each stream with which the data unit is associated, an error when the sequence number is not a next sequence number.

2. The method of claim 1 further comprising:
   determining whether a predetermined amount of time since one of a start pulse or a cyclic redundancy check (CRC) error pulse has been received has been exceeded; and
   flushing data from each of the plurality of streams when the predetermined amount of time has been exceeded.

3. The method of claim 2 wherein the flushing includes:
   marking data in each of the plurality of streams as containing an error.

4. The method of claim 1 further comprising:
   determining whether the data unit is associated with a cyclic redundancy check (CRC) error; and
   discarding the data unit when the data unit is determined to be associated with a CRC error.

5. A network device that receives packets from a plurality of streams, comprising:
   means for receiving a data unit, the data unit being associated with at least two streams in the plurality of streams and including a sequence number and a stream identifier for each stream with which the data unit is associated;
   means for determining, for each stream with which the data unit is associated, whether the sequence number is a next sequence number; and
   means for detecting, for each stream with which the data unit is associated, an error when the sequence number is not a next sequence number.

6. A network device that receives data via a plurality of streams, comprising:
   a transmitter configured to:
      transmit a data unit, the data unit being associated with at least two streams of the plurality of streams and comprising a stream identifier and a sequence number for each stream with which the data unit is associated; and
   a receiver configured to:
      receive the data unit,
      determine whether each of the sequence numbers associated with the data unit is a next sequence number for the corresponding stream, and
      detect an error when one of the sequence numbers is not a next sequence number.

7. The network device of claim 6 wherein the receiver is further configured to:
   determine whether a predetermined amount of time since one of a start pulse or a cyclic redundancy check (CRC) error pulse has been received has been exceeded, and
   flush data from each of the plurality of streams when the predetermined amount of time has been exceeded.

8. The network device of claim 7 wherein, when flushing, the receiver is configured to:
   mark data in each of the plurality of streams as containing an error.

9. The network device of claim 6 wherein the receiver is further configured to:
   determine whether the data unit is associated with a cyclic redundancy check (CRC) error, and
   discard the data unit when the data unit is determined to be associated with a CRC error.

10. A network device comprising:
   an interface transmitter configured to:
      receive a data unit comprising packet data and control information, and transmit the data unit;
a plurality of high speed transmitters, each of the high speed transmitters being configured to:
receive a portion of the data unit, and
transmit the portion of the data unit in synchronism with the other of the plurality of high speed transmitters via a high speed link;
a plurality of high speed receivers, each of the high speed receivers corresponding to one of the plurality of high speed transmitters and being configured to:
receive the portion of the data unit from the corresponding high speed transmitter, and
forward the portion of the data unit; and
a tandem aligner configured to:
receive the portions of the data unit from the plurality of high speed receivers,
correct an imbalance or delay between the portions of the data units caused by the high speed links, and
forward the corrected portions of the data unit; and
an interface receiver configured to:
receive the corrected portions of the data unit, and
reconstruct the packet data and control information from the corrected portions.

11. The network device of claim 10 further comprising:
a first set of aligners positioned between the interface transmitter and the plurality of high speed transmitters and configured to:
receive the portions of the data unit from the interface transmitter,
align the portions of the data unit from a first data width to a second data width, and
transmit the aligned portions of the data unit to the plurality of high speed transmitters,
wherein the plurality of high speed transmitters transmit the aligned portions of the data unit via the high speed links.

12. The network device of claim 11 further comprising:
a second set of aligners positioned between the tandem aligner and the interface receiver and configured to:
receive the corrected portions of the data unit from the tandem aligner,
realign the corrected portions of the data unit from the second data width back to the first data width, and
transmit the realigned portions of the data unit to the interface receiver,
wherein the interface receiver reconstructs the packet data and control information from the realigned portions.

13. The network device of claim 10 wherein the data unit is 16 bytes.

14. The network device of claim 13 wherein the packet data is 12 bytes and the control information is 4 bytes.

15. The network device of claim 10 wherein the control information includes a sequence number and a stream identifier.

16. The network device of claim 15 wherein the control information further includes flow control block information that identifies a plurality of streams and flow control information that identifies one or more streams in the plurality of streams requesting flow control.

17. The network device of claim 15 wherein the interface receiver is further configured to:
determine whether the sequence number is a next sequential sequence number for a data stream corresponding to the stream identifier, and
detect an error in the corresponding stream when the sequence number is not a next sequential sequence number.

18. The network device of claim 10 wherein the network device is associated with a plurality of streams, and
wherein the interface receiver is further configured to:
determine whether a predetermined amount of time since last receipt of one of a start pulse or a cyclic redundancy check (CRC) error pulse has been exceeded, and
flush data from each of the plurality of streams when the predetermined amount of time has been exceeded.

19. The network device of claim 18 wherein, when flushing, the receiver is configured to:
mark data in each of the plurality of streams as containing an error.

20. The network device of claim 10 wherein the interface receiver is further configured to:
determine whether the data unit is associated with a cyclic redundancy check (CRC) error, and
discard the data unit when the data unit is determined to be associated with a CRC error.

21. A method for detecting errors in a network device that receives data via a plurality of streams and comprises a first device and a second device, the method comprising:
transmitting a data unit from the first device to the second device, the data unit being associated with at least two streams of the plurality of streams and comprising a sequence number and a stream identifier for each stream with which the data unit is associated;
determining, at the second device, whether each sequence number is a next sequential sequence number; and
detecting an error when one of the sequence numbers is not a next sequential sequence number.

22. The method of claim 21 further comprising:
associating error information with the data unit based on the detecting.

23. The method of claim 21 further comprising:
transmitting a signal from the first device to the second device at predetermined time intervals; and
detecting an error when the signal is not received by the second device during the predetermined time interval.

24. The method of claim 23 wherein the signal is one of a start pulse or a cyclic redundancy check (CRC) error pulse.

25. The method of claim 23 further comprising:
flushing data in each of the plurality of streams based on detecting an error when the signal is not received by the second device during the predetermined time interval.

26. The method of claim 21 further comprising:
associating one of a start pulse or a cyclic redundancy check (CRC) error pulse with the data unit prior to transmitting; and
discarding the data unit when the a CRC error pulse is associated with the data unit.

* * * * *